W. W. Lyman.

Fruit-Can.

No 2988

Reissued Jun. 16, 1868.

Witnesses.

Albert Foster
Hiram Foster

Inventor.

W. W. Lyman

United States Patent Office.

WILLIAM W. LYMAN, OF WEST MERIDEN, CONNECTICUT.

*Letters Patent No.* 22,436, *dated December* 28, 1858; *reissue No.* 2,988, *dated June* 16, 1868.

IMPROVEMENT IN FRUIT-CANS.

The Schedule referred to in these Letters Patent and making part of the same.

TO ALL WHOM IT MAY CONCERN:

Be it known that I, WILLIAM W. LYMAN, of West Meriden, county of New Haven, and State of Connecticut, have invented certain new and useful Improvements in the Construction or Manufacture of Fruit-Cans; and te enable others skilled in the art to make and use the same, I will proceed to describe by referring to the drawings, in which the same letters indicate like parts in each of the figures.

The nature of this invention consists in providing a shoulder or seat, to receive and support an elastic packing upon the neck or body of a jar, below its upper end or edge.

It further consists in providing a rim upon the outer edge of the shoulder or (stop) seat, to form a groove or depression to receive an elastic packing-ring.

In the accompanying drawings—

In the use of rubber for a packing between the cover and the jar, it has been found almost impossible to turn the cover, in fastening it down on the rubber, without crimping it, and thus rendering the joint imperfect. This is owing to the tenacity with which the metal and gum adhere to each other, as one will not slip on the other freely. Metal surfaces, having less friction than the rubber, will more freely and truly move on each other.

Now, this invention consists in the manner in which a tight joint is formed between the cover and the jar, by the use of the rubber packing, but in such a way as that the metal is not required to slip on the rubber, but is firmly compressed (the packing) between the cover and jar, and consequently there is no danger of crimping, folding, or injuring the rubber packing, or forming imperfect joints.

A represents the jar or can, which may be made of metal, glass, or other vitrified substance. When it is made of glass, or earthen-ware, I sometimes put a metal collar, *a*, around the neck of the jar, upon which there are formed studs, screw-thread, incline plane, or projections, *c c*, these being stronger and less liable to be broken off than when made of glass or earthen-ware.

To prevent this collar from slipping around on the neck of the can or jar, a projection, *e*, may be left on the can, which may take into a recess, *f*, in the collar, and thus prevent them from slipping one upon the other. These protuberances, however, may be produced on glass jars at the time of their formation, when they (the protuberances) are made in the form of an elongated incline plane, or when they are made in the likeness of a screw-thread.

Figure 1:
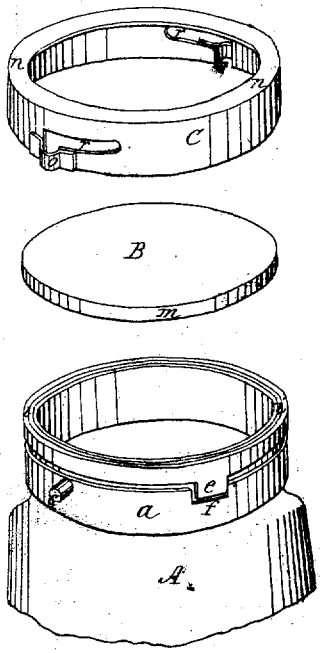
Figure 1 represents in perspective the several pieces or parts separated from each other.
Figure 2:
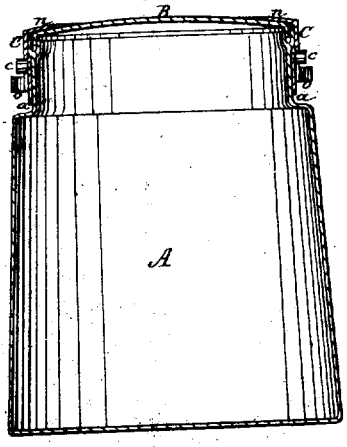
Figure 2 represents a vertical section through the can as it appears when sealed up.

Around the top of the jar or can there is a rebate or groove, *i*, upon or into which an elastic India-rubber packing-ring may be laid. This done, the cover B, which has a flange, *m*, upon it, is placed over the top of the can or jar, with its flange resting upon the elastic rubber packing-ring. Next the clamp C, with its flange *n*, is brought down over the cover B, so that the ears *o o* will take over the studs *c c* on the collar *a*, and its flange *n* rest upon the top of said cover B, as shown in fig. 2. The clamp *c* is now turned, and the cam-slots *r r*, taking over the studs *c c*, the cover is brought tight down upon the packing, and thereby rendering the interior or joint of the jar impervious to air as the pressure is brought vertically upon the rubber packing, and the metal cover is not liable to slip on the elastic or rubber packing.

When the can is made of metal, of course the studs *c c* can be made immediately upon the can, and when they are made of glass, the studs *c c*, by making them larger, or elongating them, can be made immediately upon the can or jar, and thus dispense with the collar, and instead of putting the rubber or packing in the groove, it may be placed on the top of either of the walls, or on a properly formed "shoulder or seat," by which it may be held in its proper place and position.

Having thus described the construction, as produced under one of the many forms in which the principle involved in this invention may be effected, I would now animadvert.

First. It is perfectly immaterial, when the jar or can is made of either metal, glass, or other substance, whether the protuberance or depression in or upon which the clamp gripes (to compress the cover and jar against the packing) is made on the jar or can itself, at the time of its formation, or afterward secured thereto, or whether said protuberance be in the form of a screw-thread around the neck, or in the form of incline plane, elongated projections, or projecting pins, so long as the clamp is so made as to conform thereto, to produce the result of compressing the cover and jar against the packing, to render it (the jar or joint thereof) impervious to air.

Second. It is immaterial whether the clamps C be made in a ring-form, curve, or yoke-form, so long as it is so made that it will fully serve the purpose to grapple the protuberances, or their equivalents, with the cover, or so made that it will embrace the whole body of the jar with the cover, for the purpose of firmly compressing them together against the packing, to render the jar impervious to air.

I believe I have thus shown the nature, construction, and object of this invention, so as to enable others skilled in the art to make and use the same therefrom.

What I claim, therefore, and desire to secure by Letters Patent, is—

Compressing the cover and jar together against an intervening elastic packing-ring, located between the lower edge of the flange of the cover and a seat formed below the upper end or edge of the neck or body of the jar, substantially as described.

WM. W. LYMAN. [L. S.]

Witnesses:
E. W. BLISS,
JEREMY W. BLISS.